July 28, 1970      R. L. HAMMOND      3,521,918

FISHLINE KNOTTING FIXTURE AND CUTTER

Filed Aug. 14, 1968

RICHARD L. HAMMOND
INVENTOR.

BY

Tom Sherrard, atty.

United States Patent Office 3,521,918
Patented July 28, 1970

3,521,918
FISHLINE KNOTTING FIXTURE AND CUTTER
Richard L. Hammond, P.O. Box 129,
Lakeside, Calif. 92040
Filed Aug. 14, 1968, Ser. No. 752,661
Int. Cl. D03j 3/00
U.S. Cl. 289—17      2 Claims

ABSTRACT OF THE DISCLOSURE

The combination of a fisherman's line and hook tying aid and means for cutting the free end of the line near the knot tied thereon.

BACKGROUND OF INVENTION

It is common practice to connect fishhooks directly to monofilament fishlines. The line is transparent, and being invisible to fish, a leader between the hook and line is not needed. To not frighten fish, it is highly desirable to make a small knot with little or no free end or tail extending from the knot.

Monofilament line has a smooth surface and is practically incompressible. It is nearly frictionless, especially when wet, and lines of large diameter resist bending. Because of these characteristics, heretofore, there has not been a simple, safe and quick means for securing fishhooks to the line. The pull of fish often cause a knot to slip and become untied.

Prior art grapples with the problem. Tying devices, such as that disclosed in the Clow Pat. No. 3,106,417, do not have a means for preventing a hook from becoming straightened or from becoming loose as force is exerted to cinch the knot knot during the tying process. Also, bent tabs will not serve where strong cinch bars are needed. And too an angled path between hook and mandrel is inadequate. Also, a platform in a straight line is unnecessary, especially for use with large hooks and heavy monofilament.

The preparation of a knotted hook is not completed until the free end of the line is cut off at the knot. Prior art does not provide a simple means for such cutting in association with the type knot or mandrel herein disclosed.

SUMMARY OF INVENTION

My device is a unified assembly comprising the combination strong cylindrical cinch bar positioned in direct alignment with a mandrel for retaining a line being knotted, and further position for maximum safe cinching of knot. In addition, I have combined a line cutter with the tying aid to complete the knotting steps in an integrated operation.

DESCRIPTION OF THE DRAWING

For a better understanding of the invention, reference may be had to the following description in connection with the accompanying drawing in which.

DESCRIPTION OF THE PREFERRED EMBODIMENT

Figures 1, 2:
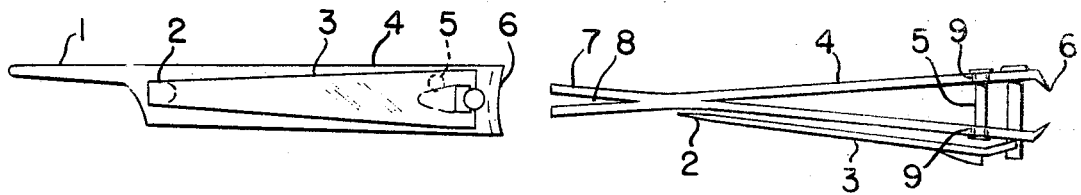
FIG. 1 represents a top plan view of my device.
FIG. 2 is one of two identical side elevations thereof.

Referring to the drawing showing the preferred structure wherein like numbers represent like parts throughout, the number 4 represents a body portion formed of two identical opposing elastic members, united at one end and provided with abutting cutting edges 6 at the other. Lever 3 is pivotally mounted thereon and it is retained by a pin through the body portion, near the cutting edges, in the manner and form of the well-known toenail clippers.

As a novel contribution, the free end of lever 3 may be tapered to form a screw driver bit 2. A handy tool for fishermen.

Distal to the cutting edges 6, a part of one side of each body portion is extended about one-third of the body portion length along a substantially straight line. The lateral dimension of the body portion is substantially reduced thereat whereby a nose or mandrel is formed. In addition, this extended section is flared out slightly in opposite directions to form the V-shaped configuration 8 of FIG. 2. This results in bifurcated jaws at the tip end of the mandrel. An additional feature consists in a beveled top edge 7 of each mandrel to make access for free end 11A of monofilament 11.

A novel feature of my combination is cinch bar 5. It is cylindrical in shape and is mounted transverse to the lengthwise dimension of the body portion. Item 5 slideably passes through orifices 9 of the body portion so the cutting action will not be impaired. Outer flanges retain it in the body portion. Bar 5's position in respect to the body portion is such that the shank of fishhook 10 is in substantially a parallel line with the edge of the body portion and mandrel when the hook is engaged with the bar.

Figure 3:
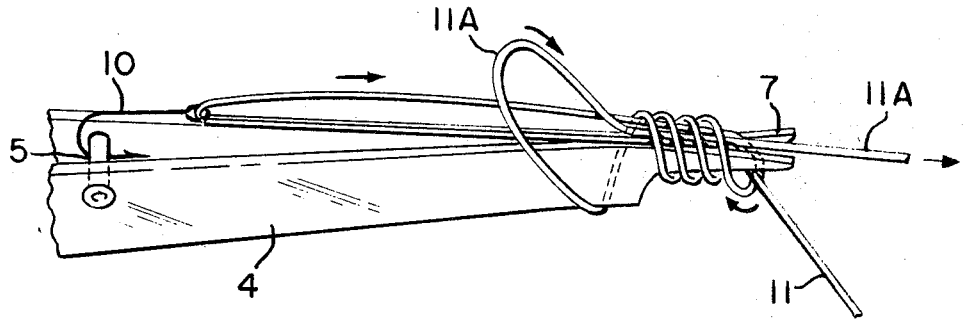
FIG. 3 is a perspective view of the tying aid portion of the device showing same in use.
Figure 4:
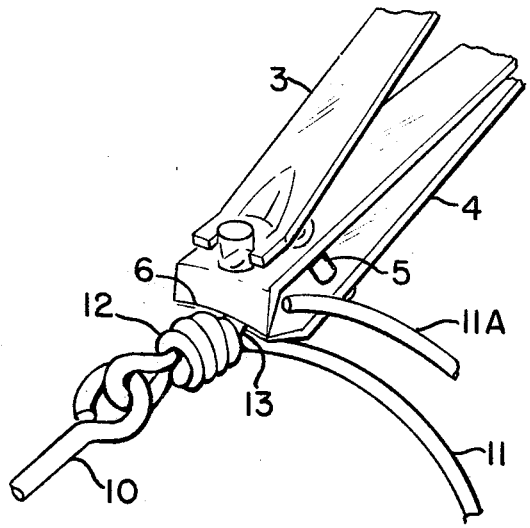
FIG. 4 is a perspective view of the cutter portion thereof showing same in use.

For use, the fisherman first threads the monofilament 11 through eye of hook 10 leaving at least six inches of line on the free end 11A. The hook is engaged with the cinch bar as illustrated and both sections of the line are doubled back and held with the wedging action of the V-shaped jaw 8. The free end 11A is looped at least three times around the mandrel and lines in direction of arrows of FIG. 3. It is thereupon pushed along the doubled back lines, along the beveled edge of the mandrel, under the loops as shown. The loops are removed by mild manual tension on the lines 11 and 11A in the area of the numerals of FIG. 3. Further pulling on line 11 alone slips the knot tight against the eye of the hook. The unique structure of my device is adaptable to good gripping and substantial force, free of danger of bending parts and injuries from fishhooks. Only after the knot is firmly cinched, may the hook be removed and the free end cut off close to loops 12 at point 13. Cutting edges 6 of my device are used, see FIG. 4. Optimum conditions have been met. Strong pulls by large fish will not untie the knot and yet there is no free end of line, beyond the loops, to frighten the fish.

I claim:
1. In a fisherman's tool
 (a) a body portion comprised of two resilient side members having portions joined rigidly together and diverging outwardly from the area of joinder to define a pair of resilient jaws;
 (b) opposed cutting means on each of said jaws movable to abutting cutting relationship;
 (c) a lever means for closing said resilient jaws to bring the cutting means into cutting position;
 (d) the distal ends of said resilient side members projecting from the area of joinder to define a tying mandrel oppositely to said resilient jaws, said mandrel having divergent ends and a grooved upper edge; and
 (e) a separate hook engaging cinch bar means extending between said resilient jaws and being freely movable through at least one of them whereby the cutting action will not be impaired.
2. A fisherman's tool as set forth in claim 1, wherein
 (1) said diverging ends have one pair of side edges in substantial alignment with a pair of side edges of said resilient jaws; and (2) said cinch bar is offset transversely of the longitudinal axis of said resilient jaws, toward said aligned edges, whereby the shank of a fishhook retained thereon may be substantially aligned with said aligned edges.

References Cited

UNITED STATES PATENTS 2,961,670 11/1960 Frame _____ 7—5.5
3,106,417 10/1963 Clow _____ 289—17

LOUIS K. RIMRODT, Primary Examiner